United States Patent [19]

Kobayashi et al.

[11] Patent Number: 4,543,634
[45] Date of Patent: Sep. 24, 1985

[54] ELECTRONIC ENGINE CONTROL SYSTEM

[75] Inventors: Nobuyuki Kobayashi; Hiroshi Ito; Yoichi Sugiura, all of Aichi, Japan

[73] Assignee: Toyota Jidosha Kabushiki Kaisha, Toyota, Japan

[21] Appl. No.: 407,543

[22] Filed: Aug. 12, 1982

[30] Foreign Application Priority Data

Aug. 13, 1981 [JP] Japan ................ 56-126882

[51] Int. Cl.$^4$ ............ F02P 5/06; F02M 3/06
[52] U.S. Cl. ............... 364/431.07; 123/417; 123/418; 123/423; 364/431.04
[58] Field of Search ........ 364/431.03, 431.04, 364/431.07; 123/413, 415, 416, 417, 418, 422, 423, 493

[56] References Cited

U.S. PATENT DOCUMENTS

| 3,487,819 | 1/1970 | Wiyazaki et al. | 123/423 |
| 3,587,764 | 6/1971 | Bowles | 123/422 X |
| 4,204,483 | 5/1980 | Harada et al. | 123/493 |
| 4,225,925 | 9/1980 | Hattori et al. | 364/431.04 |
| 4,256,073 | 3/1981 | Kobashi et al. | 123/422 |
| 4,258,683 | 3/1981 | Hattori et al. | 123/416 |
| 4,259,723 | 3/1981 | Fujisawa et al. | 123/423 X |
| 4,262,644 | 4/1981 | Walker et al. | 123/418 |
| 4,285,314 | 8/1981 | Kiencke et al. | 123/422 |
| 4,373,489 | 2/1983 | Yamaguchi | 123/422 |
| 4,426,973 | 1/1984 | Nakano et al. | 123/418 |
| 4,437,442 | 3/1984 | Yamaguchi | 123/423 X |
| 4,442,813 | 4/1984 | Nagase et al. | 123/418 |
| 4,452,212 | 6/1984 | Takase | 123/493 |

Primary Examiner—Felix D. Gruber
Attorney, Agent, or Firm—Cushman, Darby & Cushman

[57] ABSTRACT

An ignition timing control system for controlling a fuel injection flow rate and an ignition timing commensurate to an intake air flow rate and an engine rotational speed. The ignition timing is controlled to the maximum permissible ignition advance angle when a throttle valve is fully closed and the fuel injection is stopped, for example, during deceleration, and thereafter, the ignition timing is controlled to the optimum ignition advance angle commensurate to an engine rotational speed upon return to the fuel injection.

8 Claims, 4 Drawing Figures

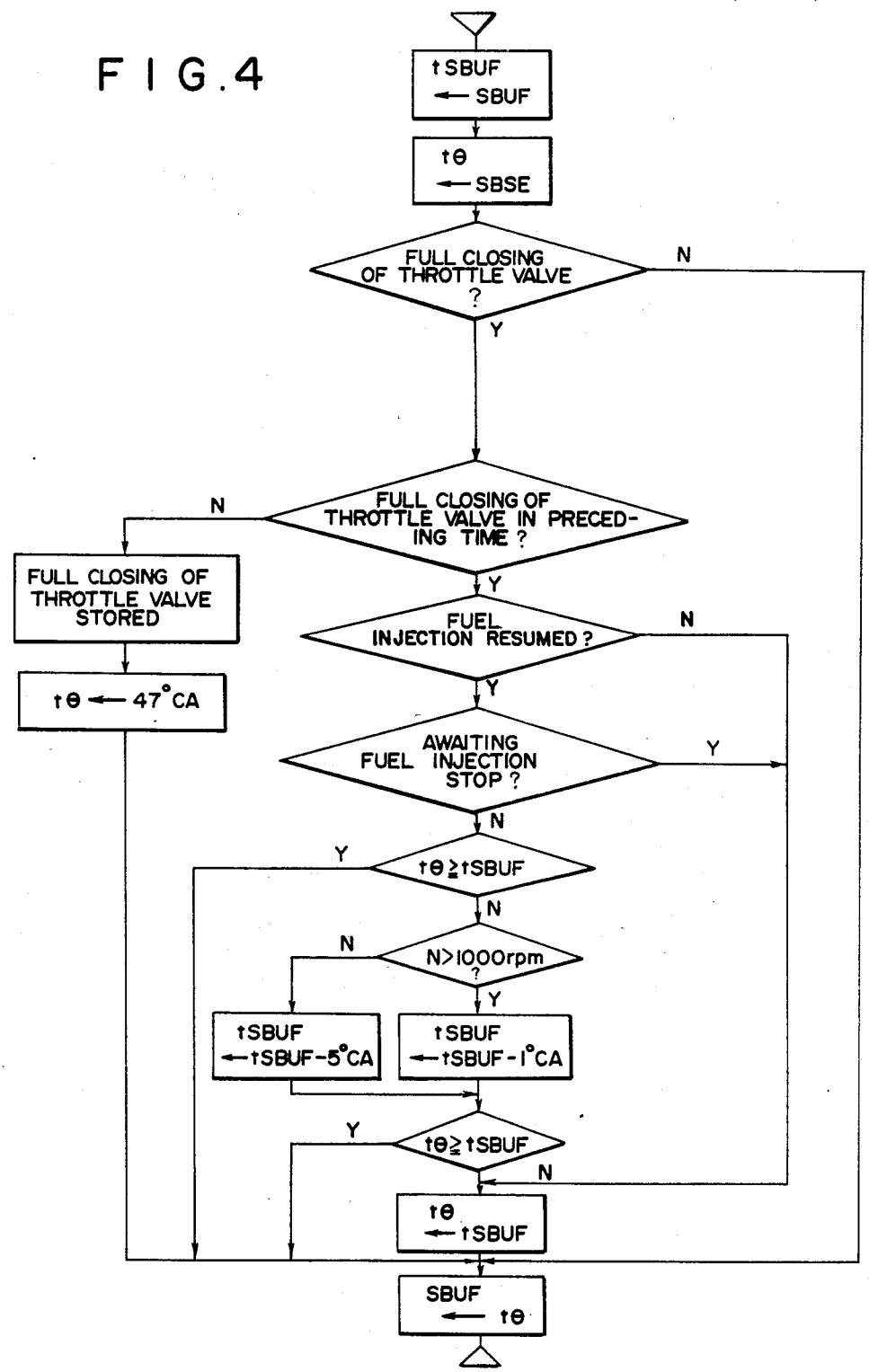

ELECTRONIC ENGINE CONTROL SYSTEM

BACKGROUND OF THE INVENTION

1. Field of the Invention

This invention relates to electronic engine control systems, and more particularly to an electronic engine control system capable of controlling ignition timing of an engine having a gasoline injection device.

2. Description of the Prior Art

Heretofore, there have been known engines each provided thereon with a fuel injection device in which a basic fuel injection flow rate is calculated from an intake air flow rate taken into the engine and a rotational speed of the engine. The basic fuel injection flow rate is then corrected in accordance with the condition of the engine in a cold state and during acceleration. A resulting fuel injection signal is fed from an electronic control circuit to a fuel injection device provided on an intake manifold, and a corresponding amount of fuel is injected. In the engine provided with the fuel injection device of the type described, when the throttle valve is fully closed and the engine rotational speed exceeds a predetermined value i.e., engine braking is effected, fuel injection from the fuel injection device is stopped and a catalytic converter is prevented from being heated. Additionally, if fuel injection is directly stopped at the same time the throttle valve becomes fully closed, a shock acts on the vehicle. Hence, a time period is provided between the full closing of the throttle valve and the fuel injection stop.

In controlling the ignition timing of the engine provided with the described fuel injection device, one of the basic ignition advance angles, determined in accordance with the engine rotational speed and the intake air flow rate, which has been previously stored in an electronic control circuit such as a microcomputer, is selected commensurate to the engine rotational speed and the intake air flow rate. A correction ignition advance angle is then determined by intake air temperature, engine coolant temperature and the like and is added to the basic ignition advance—angle so as to determine the optimum ignition advance angle. An ignition signal is then fed from the electronic control circuit to an igniter, whereby a time period for current passage and the ignition timing is controlled.

However, in controlling the ignition timing of the engine provided with the conventional fuel injection device, even when fuel injection has stopped during engine braking and during the time period for awaiting the fuel injection to stop at the very beginning of engine braking ignition timing is controlled by the ignition advance angle determined by the intake air flow rate and the engine rotational speed which tends to lag. Consequently, if the throttle valve is abruptly closed during deceleration, then a gasified fuel-air mixture becomes over-rich upon completion of deceleration. Incomplete combustion of the gasified fuel-air mixture occurs during the combustion stroke due to the relatively retarded ignition advance angle and the slow burning rate of over-rich mixtures to cause after-burns, thereby presenting disadvantages of increased heat loss and possible engine overheating.

SUMMARY OF THE INVENTION

In order to obviate the above-described disadvantages, it is thought to advance the ignition timing within an after-burn occurring region, and to control ignition timing to an optimum ignition advance angle upon return of fuel injection. However, control of the ignition timing toward an optimum angle under an engine rotational speed less than a predetermined one may result in the disadvantage of an engine failure.

The present invention has been developed to obviate the above-described disadvantages and has as its object the provision of an electronic engine control system, in which, when fuel injection is stopped or during the time period for awaiting fuel injection to stop, in the after-burn occurring region, the ignition timing is controlled to the maximum ignition advance angle to prevent after-burns for occurring, and when fuel injection returns, ignition timing is progressively adjusted to the optimum ignition advance angle at a rate commensurate to the engine rotational speed so as to prevent after-burns from ocurring during deceleration and avoid an engine failure.

To achieve the above-described objects, according to the present invention, the electronic engine control system comprises: an engine rotation sensor for detecting a rotational speed of the engine and outputting an engine rotational speed signal; a throttle closing detector for detecting the full closing of the throttle valve and outputting a throttle closed signal; in response thereto and a control circuit, such as a microcomputer, which causes: (1) ignition timing to be controlled to an optimum value when a throttle closed signal is not outputted, (2) ignition timing to be controlled to a maximum fixed ignition advance angle when said throttle closed signal is putputted, and, (3) upon resumption of fuel injection, ignition timing to progressively return to the optimum ignition advance angle at a rate commensurate to the engine rotational speed.

In order to progressively control the ignition timing to the optimum ignition advance angle commensurate to the engine rotational speed, for example, the control circuit outputs a signal for controlling the ignition timing to the optimum ignition advance angle at a first rate when the engine rotational speed exceeds a predetermined rotational speed, or controlling the ignition timing to the optimum ignition advance angle at a second rate larger than the first rate when the engine rotational speed is less than a predetermined rotational speed.

As described above, the ignition itming is controlled to the maximum ignition advance angle (for example, BTDC47°CA) from the time when the fuel injection stop or the time period for awaiting the fuel injection stop is detected to return of the fuel injection, and, upon return of the fuel injection, the ignition timing is controlled progressively to the otpimum ignition advance angle at a rate commensurate to the engine rotational speed. For example, for every predetermined number of degrees of crankshaft rotation, a first or a second predetermined amount is subtracted from the number of degrees of advance being provided to the ignition timing, the first or second amount being selected based on engine speed.

In consequence, the present invention can offer such advantages that after-burns during deceleration are prevented from occurring, whereby increase in pressure loss and engine overheat can be eliminated and engine failure can be prevented in the low rotation region of the engine.

BRIEF DESCRIPTION OF THE DRAWINGS

FIG. 4 is a flow sheet showing the operation of the aforesaid embodiment.

DESCRIPTION OF THE PREFERRED EMBODIMENT

Figure 1:
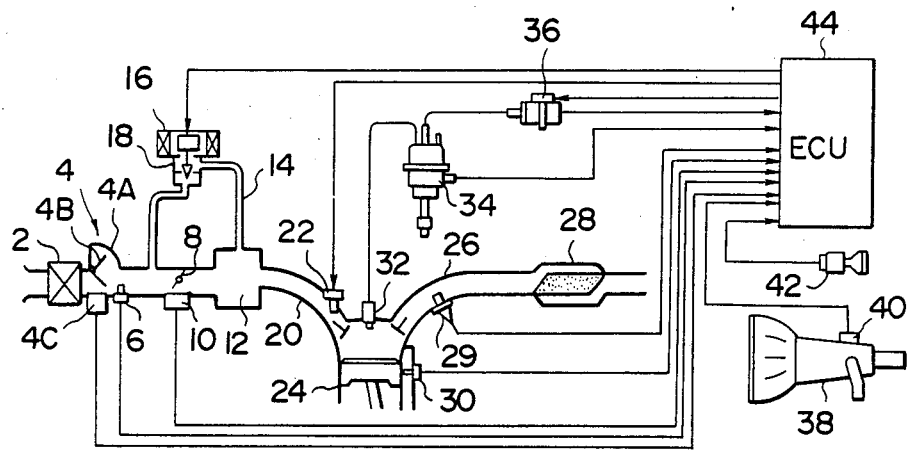
FIG. 1 is a circuit diagram showing an embodiment of the present invention.

Detailed description will hereunder be given of one embodiment of the present invention with reference to the drawings. FIG. 1 shows the present embodiment. As shown in the drawing, the present embodiment comprises an air cleaner 2 and an air flow meter 4 as being an intake air flow rate sensor, provided downstream of the air cleaner 2. The air flow meter 4 comprises a compensation plate 4B rotatably provided in a damping chamber 4A and a potentiometer 4C for detecting the opening of the compensation plate 4B. In consequence, the intake air flow rate is detected as a voltage outputted from the potentiometer 4C. Furthermore, an intake air temperature sensor 6 for detecting the temperature of intake air is provided in the vicinity of the air flow meter 4.

A throttle valve 8 is disposed downstream of the air flow meter 4, and a throttle sensor 10, such as a throttle switch for detecting when the throttle valve is fully closed and outputting a throttle closed signal is disposed in the vicinity of the throttle valve 8. Disposed downstream of the throttle valve 8 is a surge tank 12, in which is provided a bypass passage for bypassing the throttle valve 8. This bypass passage 14 is provided thereon with an air valve 18 controlled by a step motor 16. This air valve 18 causes intake air to pass through the surge tank 12, bypassing the throttle valve 8 during idling, whereby the engine rotational speed is controlled to a target value.

Connected to the surge tank 12 is an intake manifold 20, in which is provided a fuel injection device 22 projecting thereinto. The intake manifold 20 is connected to a combustion chamber of an engine 24, and the combustion chamber of the engine is connected to a catalytic converter 28 filled up with three-way catalysts, through an exhaust manifold 26. Designated at 29 is an $O_2$ sensor for controlling the gasified fuel-air mixture to the neighborhood of the theoretical air-fuel ratio, and 30 a coolant temperature sensor for detecting the engine coolant temperature.

An ignition plus 32 of the engine 24 is connected to a distributor 34, which in turn is connected to an igniter 36. Denoted at 38 is a transmission, 40 a neutral switch for detecting a neutral position of a shift lever, and 42 an ignition switch.

The distributor 34 is provided thereon with a pickup as being the engine rotation sensor and a signal rotor solidly secured to a distributor shaft, and, for example, a crank angle reference position signal is fed to an electronic control circuit 44 every 30 degrees of the crank angle. In consequence, an engine rotational speed can be obtained from the interval between the crank angle reference position signals and the number of the crank angle reference position signals.

Figure 3:
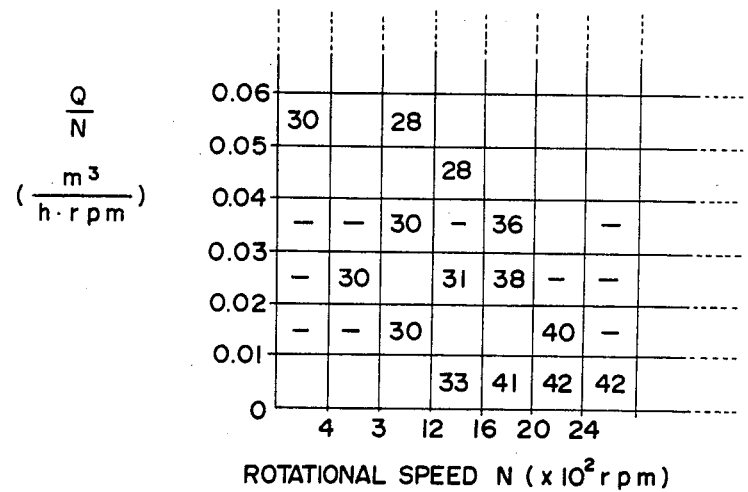
FIG. 3 is a chart showing the basic ignition advance angle determined by the rotational speed and the ratio between the intake air flow rate and the rotational speed.
Figure 2:
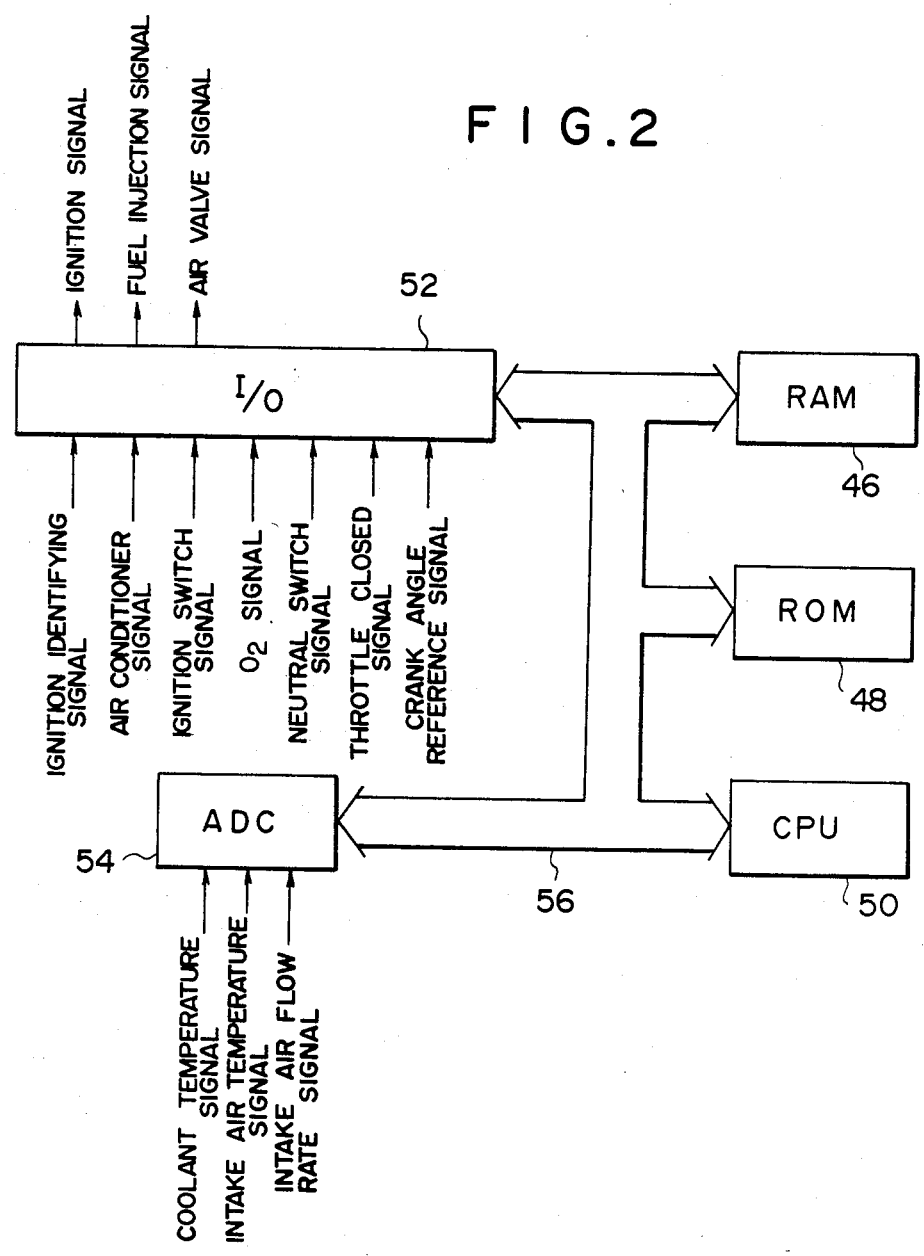
FIG. 2 is a block diagram showing an electronic control circuit in the aforesaid embodiment.

As shown in FIG. 2, the electronic control circuit 44 includes: a Random Access Memory (RAM) 46, a Read Only Memory (ROM) 48, a central processing unit (CPU) 50, an input/output circuit (I/O) 52 and an analogue/digital converter (ADC) 54, and the RAM 46, FOM 48, CPU 50, I/O 52 and ADC 54 are connected to one another through a data bus 56. The ROM 48 of the electronic control circuit 44 stores therein the engine rotational speeds N as shown in FIG. 3, a map of the basic ignition advance angles indicated by a ration Q/N between the intake air flow rate Q and the engine rotational speed N (The figures in the map equal in unit to the crank angles (°CA) of Before Top Dead Center (BTDC), the basic injection flow rates and the like. Inputted into the I/O 52 are: a crank angle reference signal outputted from the distributor 34; a throttle position signal outputted from the throttle sensor 10; a neutral switch signal outputted from the neutral switch 40; an air conditioner signal outputted from the air conditioner, not shown; an ignition switch signal outputted from the ignition switch 42; an ignition identifying signal outputted from the igniter 36; and $O_2$ signal related to the presence or absence of oxygen outputted from the $O_2$ sensor 29, and the like. The I/O 52 outputs an air valve signal for controlling the air valve 16, a fuel injection signal for controlling the fuel injection device 22, an ignition signal for controlling the igniter 36 and the like. Inputted to the ADC 54 are: an intake air flow rate signal outputted from the air flow meter 4; an intake air temperature signal outputted from the intake air temperature sensor 6; and a coolant temperature signal outputted from the coolant temperature sensor 30, and all of these signals are converted into digital signals by the ADC 54. Depending upon the controlled conditions of the engine, various maps may be stored in the ROM 48, and various other signals are inputted to or outputted from the I/O 52 and the ADC 54.

Description will hereunder be given of the operation of the present embodiment with reference to FIG. 4. In the following, description will be given of the case of controlling the ignition timing to the maximum ignition advance angle at the time of the fuel injection stop or during the time period for awaiting the fuel injection stop, which represents the first characteristic feature of the present invention, and the case of progressively controlling the ignition timing to the optimum ignition advance angle upon return to the fuel injection. However, control of the fuel injection flow rate and the intake air flow rate is made in the same manner as in the prior art, so that description thereof will be omitted. Furthermore, operation shown in FIG. 4 is effected by an interruption, for example, every 30 degrees of the crank angle.

Firstly, an execution ignition advance angle SBUF, at which the igniter 36 has actually been controlled in the preceding time, is stored in a register tSBUF, and a basic ignition advance angle SBSE determined by the intake air flow rate and the engine rotational speed as shown in FIG. 3 is stored in a register t$\theta$. Subsequently, judgment is made whether a throttle valve full closing signal has been fed from the throttle sensor 10 or not. When no throttle valve full closing signal is fed, i.e., the engine is not in the idling condition, the igniter 36 is controlled to the optimum ignition advance angle, in which correction ignition advance angles are added to a basic ignition advance angle (the value in the map shown in FIG. 3), as the execution ignition advance angle SBUF.

In the subsequent interruption, in the same manner as in the preceding interruption, the execution ignition advance angle SBUF is stored in the register tSBUF, the basic ignition advance angle SBSE is stored in the register tθ, and judgment is made whether the throttle valve is fully closed or not. Here, if the throttle valve is fully closed, then, in the succeeding step, judgment is made whether the throttle valve has been fully closed or not in the preceding time. When the throttle valve has not been fully closed in the preceding time, i.e., the full closing of the throttle valve is presently being detected for the first time, the full closing of the throttle valve is stored in the RAM 46, and the maximum ignition advance angle (for example, BTDC47°CA) at which knocking cannot occur is stored in the register tθ in place of the basic ignition advance angle SBSE. Then, the value of the register tθ, i.e., BTDC47°CA is made to be the execution ignition advance angle SBUF and an ignition signal is fed to the igniter 36. In consequence, when the throttle valve is fully closed for the first time as in the course of deceleration, etc., the ignition timing is immediately controlled to BTDC47°CA.

Furthermore, in the subsequent interruption, in the same manner as in the preceding interruption, the execution ignition advance angle SBUF is stored in the register tSBUF, and the basic ignition advance angle SBSE is stored in the register tb. Here, the value of the execution ignition advance angle SBUF has been changed to BTDC47°CA in the preceding interruption. In addition, the value of the basic ignition advance angle SBSE is that determined by the map as shown in FIG. 3 similarly to the preceding time and the time before the preceding. Subsequently, judgment is made whether the throttle valve is fully closed or not, and, when the throttle valve is fully closed, judgment is made whether the throttle valve has been fully closed in the preceding time or not. Here, when the throttle valve was fully closed in the preceding time, i.e., the full closing of the throttle valve (the idling condition) continues, judgment is made whether fuel injection has resumed after having been stopped due to detection of the throttle valve having been closed, i.e., whether the fuel injection stop continues or not, or whether the time period for awaiting the fuel injection stop continues or not. The decision to resume is made on the basis of the fact that the throttle valve is fully closed and the engine rotational speed is less than a predetermined rotational speed. Here, when fuel injection has not resumed, the value stored in the register tSBUF is shifted to the register tθ. Since BTDC47°CA is stored in the register tSBUF, BTDC47°CA is stored in the register tθ, subsequently, the value (BTDC47°CA) of the register tθ is fed to the igniter 36 as being the execution ignition advance angle SBUF, whereby the igniter 36 is controlled to BTDC47°CA.

Then, in the subsequent interruption, in the same manner as in the preceding interruption, the execution ignition advance angle SBUF is stored in the register tSBUF and the basic ignition advance angle SBSE is stored in the register tθ. Here, since the execution ignition advance angle SBUF in the preceding time is BTDC47°CA, BTDC47°CA is stored in the register tSBUF. In addition, the basic ignition advance angle SBSE equals to the value in the map shown in FIG. 3, similarly to the preceding time. Subsequently, judgment is made whether the full closing of the throttle valve continues or not, and, when the full closing continues, judgment is made whether the fuel injection stop or the time period for awaiting the fuel injection stop continues or not. Here, when the fuel injection has resumed, i.e., neither fuel injection stop nor time period for waiting the fuel injection stop continues, judgment is made whether the valve of the register tθ exceeds the value of the register tSBUF or not. When the value of the register tθ exceeds the value of the register tSBUF, i.e., the value of the basic ignition advance angle exceeds BTDC47°CA, the value (the value in the map shown in FIG. 3) of the register tθ is made to be the execution ignition advance angle to control the igniter 36.

On the other hand, the value stored in the register tSTUB is larger than the value stored in the register tθ, judgment is made whether the engine rotational speed exceeds a predetermined rotational speed (for example, 1,000 rpm) or not, and, when the engine rotational speed exceeds the predetermined rotational speed, for example, BTDC1°CA is subtracted from the value of the register tSBUF and the result thus obtained is turned into the value of the register tSBUF. Thereafter, judgment is made whether the value stored in the register tθ exceeds the value stored in the register tSBUS or not, and, when the value stored in the register tθ exceeds the value stored in the register tSBUF, the igniter 36 is controlled to the basic ignition advance angle in the map shown in FIG. 3. In contrast thereto, when the value stored in the register tSBUF exceeds the value stored in the register tθ, the value of the register tSBUF is shifted to the register tθ, the value of the register tθ is made to be the execution ignition advance angle SBUF, i.e., the igniter 36 is controlled to the execution ignition advance angle BTDC46°CA, whereby the ignition timing is progressively controlled to the basic ignition advance angle at the first rate.

In contrast thereto, when the engine rotational speed is less than 1,000 rpm, for example, BTDC5°CA is subtracted from the value of the register tSBUF (BTDC47°CA) and the result thus obtained is turned into the value of the register tSBUF. Thereafter, judgment is made whether the value stored in the register tθ exceeds the value stored in the register tSBUF or not, and when the value stored in the register tθ exceeds the value of the register tSBUF, the igniter 36 is controlled to the basic ignition advance angle in the map shown in FIG. 3. In contrast thereto, when the value stored in the register tSBUF exceeds the value stored in the register tθ, the value of the register tSBUF is shifted to the register tθ, the value of the register tθ is made to be the execution ignition advance angle SBUF, i.e., the igniter 36 is controlled to the execution ignition advance angle BTDC42°CA, whereby the ignition timing is quickly controlled to the basic ignition advance angle at the second rate larger in value than the first rate, so that the engine rotational speed can be lowered to an idling rotational speed.

In addition, in controlling the ignition timing to the value in the map shown in FIG. 3 in the above-described operation, ignition corrections are to be made by the coolant temperature signal, the air conditioner signal and the like, then simultaneous corrections are made, and, the igniter 36 is controlled to the execution ignition advance angle thus corrected. In consequence, the igniter 36 is controlled to the optimum ignition advance angle meeting the conditions of the engine.

As the control is effected as described above, the ignition timing is controlled to BTDC47°CA during the time period from the initial full closing of the throttle valve to the return to the fuel injection, and, after the return to the fuel injection, the ignition timing is controlled to the value, in which, for example, BTDC5°CA is subtracted from BTDC47°CA each time. Additionally, the value thus forcedly advanced is smaller than the basic ignition advance angle in the map, the ignition timing is controlled to the value in the map.

From the foregoing description, it should be apparent to one skilled in the art that the above-described embodiment is but one of many possible specific embodiments which can represent the applications of the principles of the present invention. Numerous and varied other arrangements can be readily devised by those skilled in the art without departing from the spirit and the scope of the invention.

What is claimed is:

1. An electronic engine control system with a fuel injector and an igniter for controlling the ignition timing of an engine, comprising:
    throttle valve closing detecting means for detecting the full closing of a throttle valve of the engine and outputting a throttle closed signal in response thereto;
    engine rotational speed detecting means for detecting an engine rotational speed and outputting a speed signal; and
    control means for: (1) controlling ignition timing of the engine to an optimum ignition advance angle related to engine rotational speed and intake air flow rate of the engine when said throttle closed signal is not outputted, (2) controlling ignition timing to a maximum fixed ignition advance angle when said throttle closed signal is outputted, and (3) progressively controlling the ignition timing from the maximum ignition advance angle to the optimum ignition advance angle at a rate related to the engine rotational speed determined by said speed signal when said throttle closed signal is outputted and fuel injection resumes after having been stopped due to detection of said throttle valve being closed.

2. An ignition timing control system as claimed in claim 1, wherein the maximum fixed ignition advance angle is much larger than the maximum value the optimum ignition advance will obtain.

3. An ignition timing control system as claimed in claim 1, wherein said progressive controlling function (3) of said control means progressively subtracts first fixed angles from the ignition timing when said engine speed is below a predetermined value and progressively subtracts second fixed angles from the ignition timing when said engine speed is above said predetermined value.

4. An ignition timing control system as claimed in claim 3, wherein said first fixed angles are all the same and said second fixed angles are all the same.

5. An ignition timing control system as claimed in claim 4, wherein said first fixed angles are much larger than said second fixed angles.

6. An ignition timing control system as claimed in claim 5, wherein said first fixed angles are about 5°.

7. An ignition timing control system as claimed in claim 4, wherein said second fixed angles are about 1°.

8. An ignition timing control system as claimed in claim 5, wherein said predetermined speed is about 1000 RPM.

* * * * *